(12) United States Patent
Warstler (10) Patent No.: US 10,255,001 B2
(45) Date of Patent: Apr. 9, 2019

(54) METHOD AND SYSTEM OF PROVISIONING ELECTRONIC FORMS

(71) Applicant: Morgan Warstler, Austin, TX (US)

(72) Inventor: Morgan Warstler, Austin, TX (US)

( * ) Notice: Subject to any disclaimer, the term of this patent is extended or adjusted under 35 U.S.C. 154(b) by 0 days.

(21) Appl. No.: 15/615,443

(22) Filed: Jun. 6, 2017

(65) Prior Publication Data

US 2017/0351660 A1   Dec. 7, 2017

Related U.S. Application Data

(60) Provisional application No. 62/346,242, filed on Jun. 6, 2016, provisional application No. 62/346,251, filed on Jun. 6, 2016.

(51) Int. Cl.
*G06F 17/27* (2006.01)
*G06F 3/06* (2006.01)
*G06F 17/24* (2006.01)

(52) U.S. Cl.
CPC .......... *G06F 3/0667* (2013.01); *G06F 17/243* (2013.01); *G06F 17/2765* (2013.01)

(58) Field of Classification Search
CPC ....................................................... G06F 17/02
USPC .................................................. 704/1, 9, 10
See application file for complete search history.

(56) References Cited

U.S. PATENT DOCUMENTS

| | | | | |
|---|---|---|---|---|
| 8,532,978 B1* | 9/2013 | Turner | ................ | G06F 17/271 704/10 |
| 9,928,229 B2* | 3/2018 | Allen | .................... | G06F 17/243 |
| 2003/0028792 A1* | 2/2003 | Plow | ..................... | G06F 17/243 713/193 |
| 2004/0102958 A1* | 5/2004 | Anderson, IV | ..... | G06F 17/2775 704/4 |
| 2007/0130134 A1* | 6/2007 | Ramsey | ................ | G06F 17/243 |
| 2010/0037132 A1* | 2/2010 | LoPucki | ............... | G06F 17/218 715/269 |
| 2010/0131544 A1* | 5/2010 | Kilgour | ................. | G06F 17/248 707/769 |

* cited by examiner

*Primary Examiner* — Jesse S Pullias (57) ABSTRACT

Disclosed is a method of provisioning electronic forms based on natural language. The method includes receiving, using a communication device, a natural language input from a builder device, wherein the natural language input represents one or both of a requested data and a presented data associated with a legal process. Further, the method includes analyzing, using a processing device, the natural language input. Yet further, the method includes generating, using the processing device, an electronic form based on the analyzing of the natural language input, wherein the electronic form comprises an input field configured to receive the requested data and an output field configured to present the presented data. Moreover, the method includes storing, using a storage device, the electronic form. Furthermore, the method includes transmitting, using the communication device, the electronic form to one or more user devices.

18 Claims, 5 Drawing Sheets

METHOD AND SYSTEM OF PROVISIONING ELECTRONIC FORMS

The current application claims a priority to the U.S. Provisional Patent application Ser. No. 62/346,242 filed on Jun. 6, 2016, and to the U.S. Provisional Patent application Ser. No. 62/346,251 filed on Jun. 6, 2016.

FIELD OF THE INVENTION

The present invention relates to electronic forms. In particular, the present invention relates to a method and a system of provisioning electronic forms.

BACKGROUND OF THE INVENTION

Across the world, government agencies have incompletely adapted to the digital age. The online application forms have replaced paper forms. However, the online application forms generally are simply PDF or XML documents and the processing of these forms generally lacks security of personal information and means to guarantee the integrity of the data.

When government agencies do replace paper applications with secure and effective digital-native applications (for example, for smartphones or computers) in a computer language (such as JavaScript), each new application generally has a unique design specific to a specific agency or a particular service, causing problems for the agency to create the various forms and also for users to understand the various forms. Further, the intent of the elected officials who write the laws may be lost in translation while electronic forms are prepared.

Therefore, there is a need for methods and systems to provision electronic forms based on laws of the land in a transparent, efficient and secure fashion.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed is a method of provisioning electronic forms based on natural language. The method includes receiving, using a communication device, a natural language input from a builder device, wherein the natural language input represents one or both of a requested data and a presented data associated with a legal process. Further, the method includes analyzing, using a processing device, the natural language input. Yet further, the method includes generating, using the processing device, an electronic form based on the analyzing of the natural language input, wherein the electronic form comprises an input field configured to receive the requested data and an output field configured to present the presented data. Moreover, the method includes storing, using a storage device, the electronic form. Furthermore, the method includes transmitting, using the communication device, the electronic form to one or more user devices.

According to some embodiments, a system of provisioning electronic forms based on natural language is disclosed. The system includes a communication device configured for receiving a natural language input from a builder device, wherein the natural language input represents at least one of a requested data and a presented data associated with a legal process. Further, the communication device is configured for transmitting an electronic form to at least one user device. The system also includes a processing device configured for analyzing the natural language input, generating the electronic form based on the analyzing of the natural language input, wherein the electronic form comprises an input field configured to receive the requested data and an output field configured to present the presented data. Moreover, the system includes a storage device configured for storing the electronic form.

According to some aspects, the disclosed system may allow government agencies to easily create applications for citizens, by means of standardized cards written in a legal and computer language readable by both laymen (that is, those without expertise in either law or software) and the machines. Further, confidentiality may be ensured by creating a unique transaction session after authorization of both an agency service and a user device, with availability ensured by a cloud server and a redundant local server and transaction receipt integrity ensured by hash chain transaction signature.

Moreover, the system may automate the performance of ministerial acts and may also provide transparency in the performance of discretionary and policymaking acts. Therefore, the public officials may be able to improve services provided to the citizens who elect them. Similarly, private sector organization can better serve both consumers and shareholders.

According to some aspects, the disclosed system allows public or private sector organizations to create applications with standardized cards. The system is adaptable to private sector, not for profits, businesses, political campaigns and parties.

The disclosed method to create electronic forms is protectable intellectual property, because forms and templates may not be copyrightable. Accordingly, the electronic forms created are likely not protected intellectual property and could be used by other entities, whether by licensed users of the disclosed method described or by other means (e.g. printing out or screenshotting created form).

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of provisioning electronic forms, embodiments of the present disclosure are not limited to use only in this context. For example, the disclosed techniques may be used to rank other items that given out for rent or sale.

Figure 1:
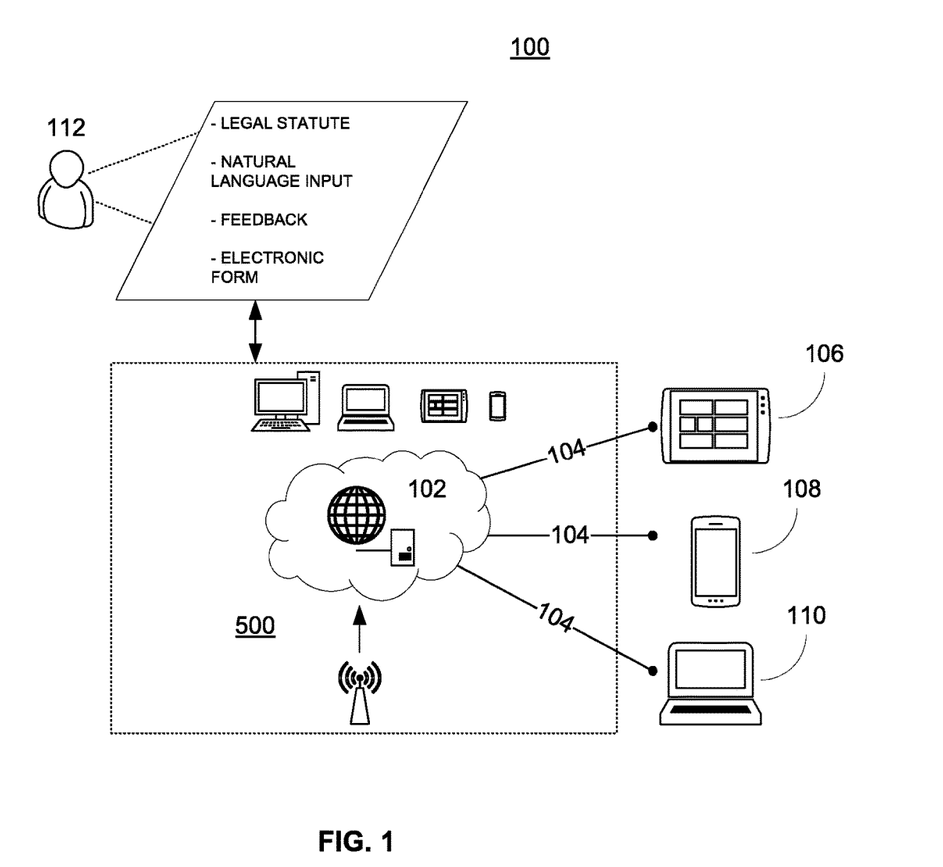
FIG. 1 illustrates an exemplary environment in which embodiments of the present disclosure may be implemented.

FIG. 1 is an illustration of a platform consistent with various embodiments of the present disclosure. By way of non-limiting example, the online platform 100 for provisioning electronic forms may be hosted on a centralized server 102, such as, for example, a cloud computing service. The centralized server 102 may communicate with other network entities, such as, for example, a mobile device (such as a smartphone, a laptop, a tablet computer etc.) and other electronic devices (such as desktop computers, etc.) over a communication network 104, such as, but not limited to, the Internet. Further, users of the platform may include one or more relevant parties such as, law makers, government agency employees and citizens. Accordingly, electronic devices operated by the one or more relevant parties may be in communication with the platform. For example, the platform may be in communication with a law maker electronic device 106 operated by the law maker, an agency employee electronic device 108 operated by the agency employee and a citizen electronic device 110 operated by the citizen.

A user 112, such as the one or more relevant parties, may access platform 100 through a software application. The software application may be embodied as, for example, but not be limited to, a website, a web application, a desktop application, and a mobile application compatible with a computing device 500. Accordingly, in an instance, the user 112 may be a law maker who may provide information about a law, a government agency employee who may provide requirements for a new electronic form, and a citizen who may access an electronic form.

Figure 2:
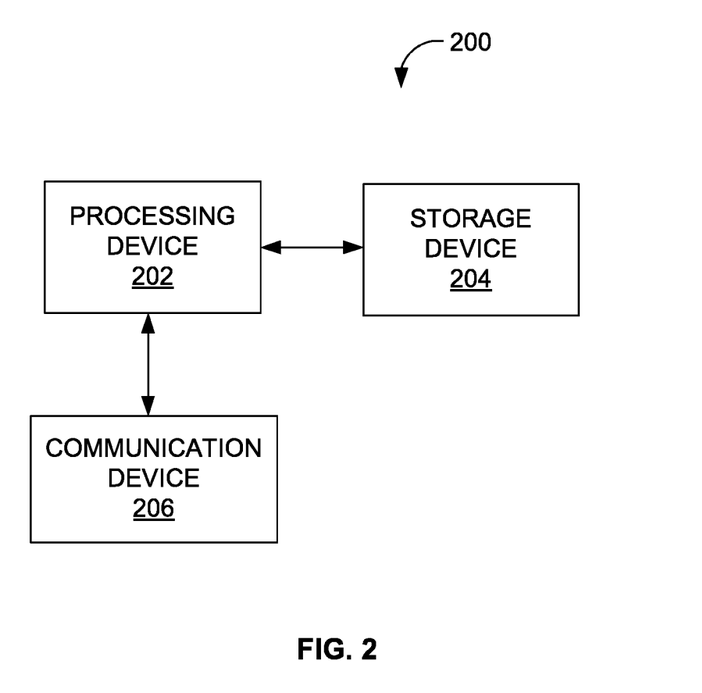
FIG. 2 illustrates a block diagram of a system of provisioning electronic forms based on natural language in accordance with some embodiments.

Turning to FIG. 2, a system 200 of provisioning electronic forms based on natural language is illustrated, in accordance with some embodiments. As shown, the system 200 includes a communication device 202, a processing device 204 and a storage device 206.

The communication device 202 may be configured to receive a natural language input from a builder device. For example, the builder device may be one of the law maker electronic device 106 and the agency employee electronic device 108. For example, the natural language input may include a description of a requirements corresponding to a law. For example, requirements for getting a hunting license. Further, the natural language input may represent one or both of a requested data and a presented data associated with a legal process. For example, the requested data may be related to one or more input fields in an electronic form and the presented data may be related to instructions provided in an electronic form.

Further, communication device 202 may be configured for transmitting an electronic form to one or more user devices (such as the citizen electronic device 110).

The processing device 204 may be configured to analyze the natural language input. In some embodiments, the analyzing of the natural language input may further include detecting, using the processing device 204, one or more of an ambiguity, a redundancy, an inconsistency, an inaccuracy and a contradiction, wherein the system 200 may further include transmitting, using the communication device, a warning to the builder device based on the detecting.

Further, the processing device 204 may be configured to generate the electronic form based on the analyzing of the natural language input. The electronic form may include an input field configured to receive the requested data and an output field configured to present the presented data. The electronic form may include a graphical user interface comprising the input field and the output field, wherein visual characteristics of each of the input field and the output field may be based on a standard template.

The storage device 206 may be configured to store the electronic form.

In further embodiments, the communication device 202 may be further configured to receive the electronic form comprising the requested data from the user device. The requested data may include environmental data captured from one or more sensors comprised in the user device. For example, the environmental data may represent a noise level in a locality, wherein the legal process may be related to a noise complaint. Further, the requested data may include multiple requested data, wherein the processing device 204 may be further configured to identify one or more user characteristics associated with a user of the user device and populating one or more requested data based on the one or more user characteristics. Therefore, the electronic form may be auto-filled.

In further embodiments, the communication device 202 may be further configured to transmit the natural language input to multiple user devices and receive multiple feedback on the natural language input. Accordingly, the processing device 204 may be further configured for generating a consolidated feedback associated with the natural language input based on the multiple feedback. For example, the feedback may include one or more of votes, comments and shares from users.

In further embodiments, the communication device 202 may be further configured to receive a legal statute associated with the legal process. Further, the communication device 202 may be configured to transmit one or more of at least one suggested input field and at least one suggested output field to the builder device. The at least one suggested input field may be based on the requested data and the at least one suggested output field may be based on the presented data. Yet further, the communication device 202 may be configured to receive one or more selections from the builder device, wherein the one or more selections may identify each of the input field from the at least one suggested input field and the output field from the at least one suggested output field. Accordingly, the processing device 204 may be further configured to analyze the legal statute and identify one or both of the requested data and the presented data based on the analyzing of the legal statute.

In further embodiments, the processing device 204 may be further configured to identify one or more suggested electronic forms based on analysis of one or both of at least a portion of the natural language input and a legal statute associated with the natural language input. The processing device 204 may be further configured to transmit the at least one suggested electronic form to the builder device, wherein the communication device 202 may be further configured for receiving at least one of a selection and a modification corresponding to the at least one suggested electronic form, wherein the generating of the electronic form is based on at least one of the selection and the modification.

In further embodiments, the processing device 204 may be further configured for generating a block chain based on the electronic form and verifying integrity of the electronic form based on the block chain, wherein the storage device 206 may be further configured for storing the block chain in association with the electronic form.

Figure 3:
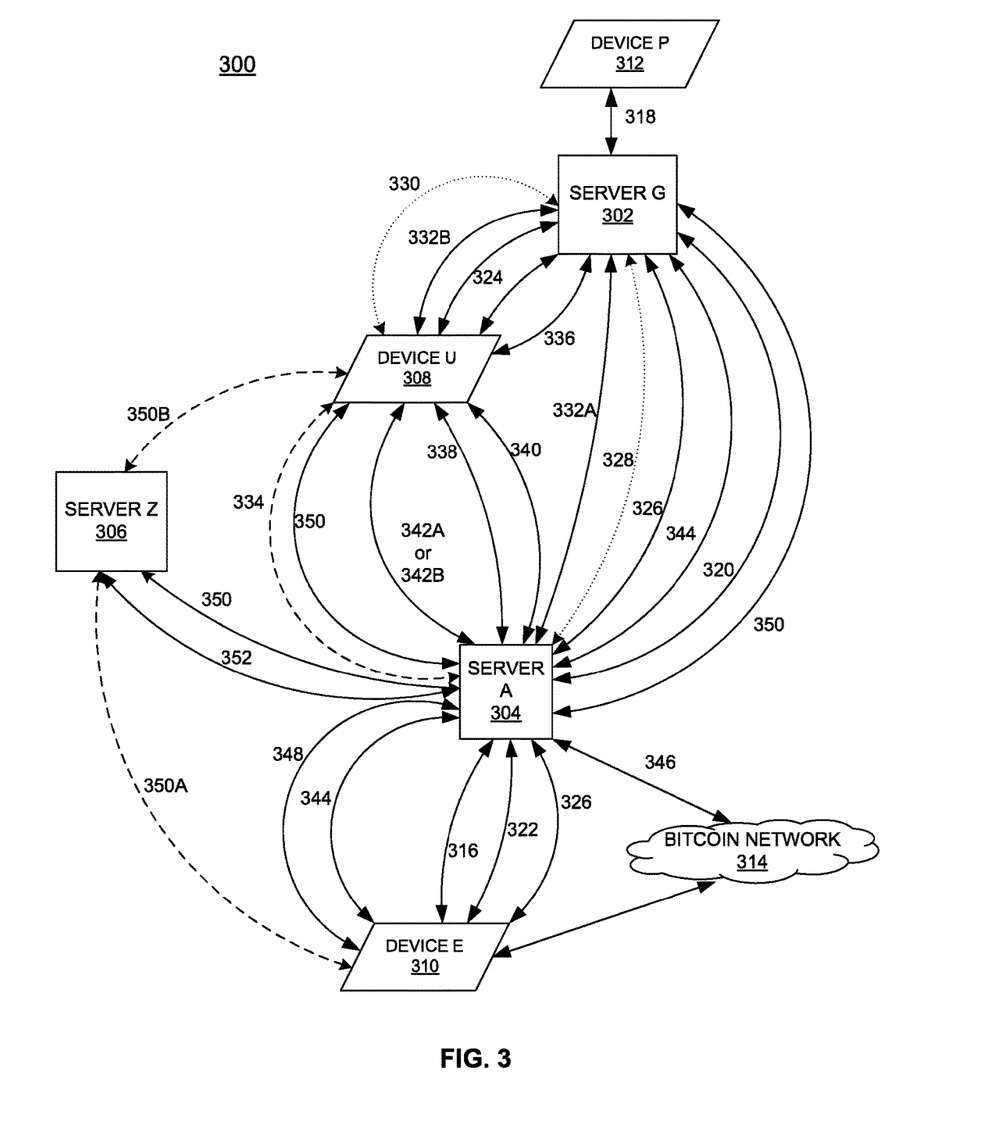
FIG. 3 illustrates a block diagram of a system of provisioning electronic forms in accordance with some embodiments.

FIG. 3 is a system 300 of provisioning electronic forms based on natural language in accordance with some exemplary embodiments. The system 300 includes a server G 302, a server A 304, a server Z 306, a device U 308, a device E 310 and a device P 312. The server G 302 may host the system 200.

The server A 304 may be an offsite agency's server. The server Z 306 may be an onsite agency's backup server. The device U 308 may be the user's smartphone or computer. The device E 310 may be an agency employee's smartphone or computer. The device P 312 may be device of a programmer.

Further, a Bitcoin network 314 (or similar such block chain network) is where hash chain transaction signature receipts are stored.

A builder is the application creation software that uses standardized cards and formatting to ensure common user experience across user applications in use by any government agency or private sector organization using the system 200. The builder maybe operated by the device E 310 or by the device P 312. The communication between the various servers and devices may be carried over the Internet though local area network Ethernet or Wi-Fi connection.

An exemplary workflow may include using the builder creating and uploading applications by the device E 310 (316) or the device P 312 (318). Further, the builder generated applications may be shared between the server A 304 and the server G 302, as depicted by 320. The device E 310 may be used to register the server A 304 with the server G 302, as depicted by 322. Further, the device U 308 may be used to register user with the server G 302, as depicted by 324. The device U 308 may be used to confirm user identity to the server G 302, as depicted by 326. The server A 304 session login may be permanent, as depicted by 328. The device U 308 login may extend for 15 minutes, as depicted by 330. The server G may be authorized with the server A 304 (as depicted by 332A) and the device U 308 (as depicted by 332B). The server A 304 and the device U 308 may be connected directly, as depicted by 334. The server G 302 may auto-fill a filing document on the device U 308, as depicted by 336. The device U 308 may be used to input remaining information needed, as depicted by 338. The device U 308 may send filing document to the server A 304, as depicted by 340. The server A 304 may check filing document for errors and then either send erroneous incomplete document back to the device U 308 (as depicted by 342A) and inform the device U 308 that document is error-free and complete (as depicted by 342B). The server A 304 may encode session ID with Shaw 2 hash, as depicted by 344. The server A 304 may send encrypted document to block chain, as depicted by 346. The server A 304 may store plain language markup code receipt with block chain key as depicted by 348. The server A 304 may send copy of receipt to the device U 308, the server Z 306, and the server G 302, as depicted by 350. In emergency mode (e.g. public emergency with internet unavailable), the server Z 306 may communicate directly via local area network to the device E 310 (as depicted by 350A) and the device U 308 (as depicted by 350B). Post-emergency with internet restored, any new transaction may be sent to the server A 304, as depicted by 352.

Any software application created for a particular filing document may include different standardized cards each of a common template and design, easily adaptable to other agencies with similar application requirements. Different applications may require different cards (e.g. one filing document may require GPS location, another, online payment). Each card may be a separate submodule that may run on the server A 304, in one or more containers. When the device U 308 logs in and selects a particular application, the server G 302 may group together and provide access to the necessary submodules comprising the selected application.

Once the server G 302 has completed its authorizing confirmation and auto-fills data from registration in filing document created by the server A 304 application software, the device U 308 user completes the document by submitting additional requested information. After the device user sends in document, the server A 304 may confirm that the device U 308 user has submitted a completed filing document with no errors on its face (and if application requires, a completed payment transaction). If there are any errors, the user may be looped back to add information and then re-send. If there are no errors, Shaw 2 hash (or by use of similar technology) may be employed.

The server Z 306 is unique in that contains both the server G 302 log-in (or authorizing) modules and the server A 304 and the server G 302 application software modules (with every server G transaction record automatically copied to the server Z 306). The server A 304 and the server G 302 would typically both be operated by the server G 302 user, which may very well be out of state or otherwise distance from the server A 304 user. The server Z 306 may be kept locally to the server A 304 user (typically a government agency, but could be a business or other entity), so in case of internet failure (or other catastrophe), the server Z 306 may continue to operate as a local network.

By use of this technology, the government agencies may automate the processing of magisterial acts. As the US Supreme Court has written, *"A ministerial duty, the performance of which may, in proper cases, be required of the head of a department, by judicial process, is one in respect to which nothing is left to discretion. It is a simple, definite duty, arising under conditions admitted or proved to exist, and imposed by law."* Mississippi v. Johnson, 71 U.S. (4 Wall.) 475, 501, 18 L. Ed. 437 (1866).

The server G 302 may host a software that is able to complete the requisite tasks and provide the user with the useful tool described herein. The build software may create application software that use standard templates and design and are written in plain language markup code, so that the computer code for the filing documents created (both when blank and completed) are also readable in a written human language (whether English, Spanish, French or any other common tongue that users wish). The server G 302 confirms the identity of the device U 308 and the device E 310 (the latter typically an employee of the server A 304 user) by use of authorizing system utilizing password, location and/or other identifying information. It then authenticates the device E 310 and the server A 304 before connecting them in a session. Encoding the receipt in block chain is necessary to provide a time stamp and confirmation that data has not been erased or edited. The transaction record is stored in the server G 302, the server A 304 and the server Z 306 as a line in database files for each specific application and user.

The components listed above and shown in FIG. 3 may be necessary for the system 300 to operate properly and provide the required output. The server G 302 is necessary for the authorizing step. Without the server Z 306, there will be no receipt backup. Without the Bitcoin network 314, there will be no tamper proof confirmation of data integrity. Without the server A 304 or the devices E 310 and U 308, there will be no transaction of any kind.

Further, the system 300 may include optional elements. For example, adding a text message module or video conference module may be included to allow for text or video chats between the device U 308 user and the device E 310 user (a private citizen and a government employee respectively). The video module may also be included for the creation of a bodycam application for police agencies and legislators meeting with registered lobbyists. It may also be used to take testimony legislative, agency, arbitration or court hearings. The use the system 300 may not only allow for the automation of ministerial acts by government agencies but also for bringing transparency and more accurate information related to the performance of discretionary acts and policy decisions by government officials.

Further, the application software may be voted on and enacted. Whether the statute would actually be code written out in ordinance or simply enacted by reference to a publicly available website, both public officials and private citizens will able to read, debate and understand law as code. Biometric identification may be used to confirm the identity of users before completing a transaction.

Figure 4:
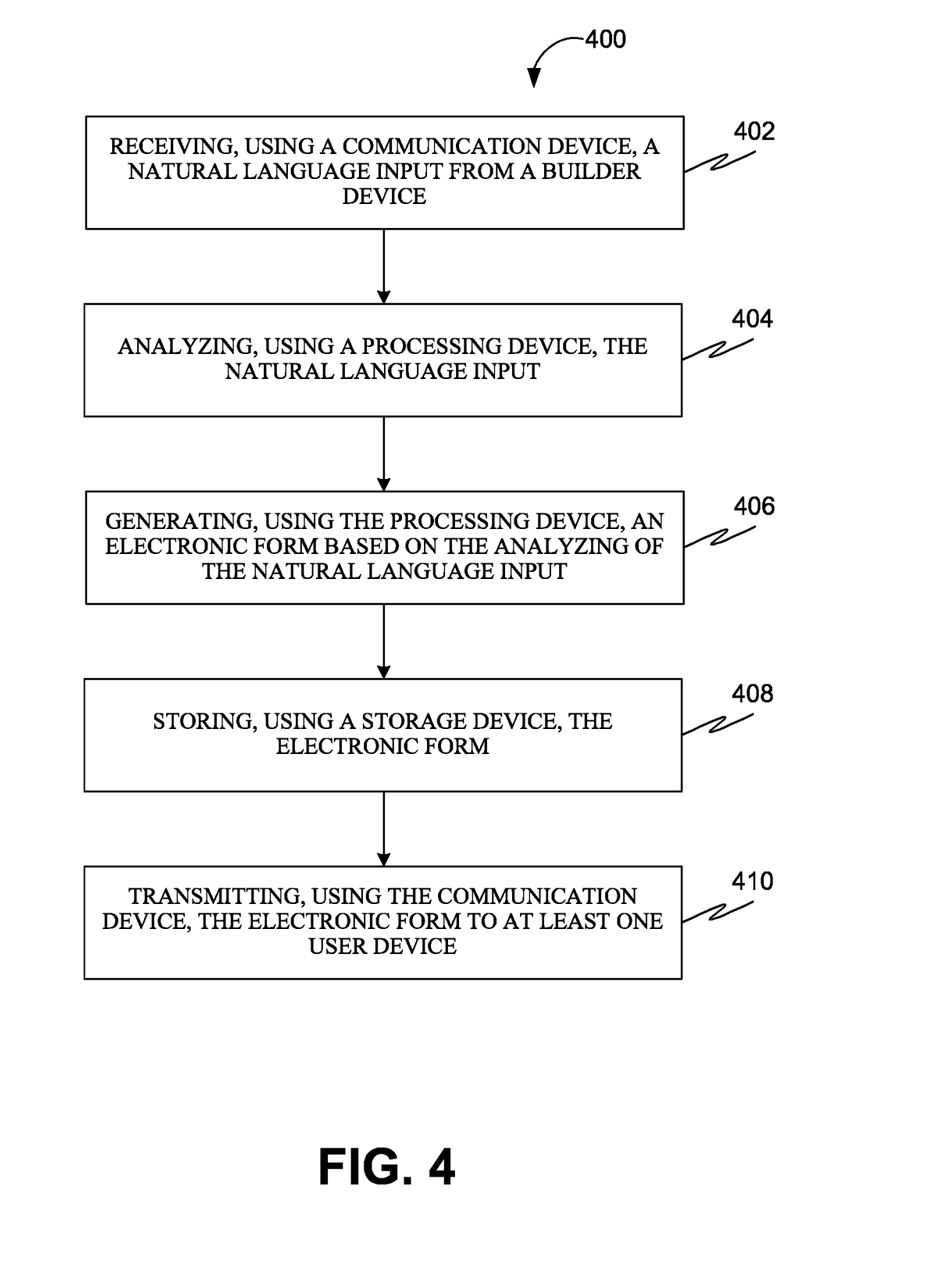
FIG. 4 illustrates a flowchart of a method of provisioning electronic forms based on natural language in accordance with some embodiments.

FIG. 4 illustrates a flowchart of a method 400 for provisioning electronic forms based on natural language, in accordance with some embodiments. The electronic form may include a graphical user interface comprising the input field and the output field, wherein visual characteristics of each of the input field and the output field may be based on a standard template.

At 402, the method 400 includes receiving, using a communication device (such as the communication device 202), a natural language input from a builder device. The natural language input may represent one or both of a requested data and a presented data associated with a legal process.

At 404, the method 400 includes analyzing, using a processing device (such as the processing device 204), the natural language input. The analyzing of the natural language input may further include detecting, using the processing device, one or more of an ambiguity, a redundancy, an inconsistency, an inaccuracy and a contradiction, wherein the method 400 may further include transmitting, using the communication device, a warning to the builder device based on the detecting.

At 406, the method 400 includes generating, using the processing device, an electronic form based on the analyzing of the natural language input. The electronic form may include an input field configured to receive the requested data and an output field configured to present the presented data.

At 408, the method 400 includes storing, using a storage device (such as the storage device 206), the electronic form.

At 410, the method 400 includes transmitting, using the communication device, the electronic form to one or more user devices.

The method 400 may further include receiving, using the communication device, the electronic form comprising the requested data from the user device. The requested data may include environmental data captured from one or more sensors comprised in the user device. The environmental data may represent a noise level, wherein the legal process is a noise complaint. Further, the requested data may include multiple requested data, wherein the method further comprises identifying, using the processing device, one or more user characteristics associated with a user of the user device; and populating, using the processing device, one or more requested data based on the one or more user characteristics.

Further, the method 400 may include transmitting, using the communication device, the natural language input to multiple user devices. Yet further, the method 400 may include receiving, using the communication device, multiple feedback on the natural language input. Moreover, the method 400 may include generating, using the processing device, a consolidated feedback associated with the natural language input based on the multiple feedback. The feedback may include one or more of votes, comments and shares from users.

In further embodiments, the method 400 may include receiving, using the communication device, a legal statute associated with the legal process. Also, the method 400 may include analyzing, using the processing device, the legal statute. Further, the method 400 may include identifying, using the processing device, one or both of the requested data and the presented data based on the analyzing of the legal statute. Yet further, the method 400 may include transmitting, using the communication device, one or both of at least one suggested input field and at least one suggested output field to the builder device. The at least one suggested input field may be based on the requested data, wherein the at least one suggested output field may be based on the presented data. Moreover, the method 400 may include receiving, using the communication device, one or more selections from the builder device, wherein the one or more selections identify each of the input field from the at least one suggested input field and the output field from the at least one suggested output field. Therefore, the method 400 may auto-suggest standardized cards based on the legal statute.

In further embodiments, the method 400 may include identifying, using the processing device, one or more suggested electronic forms based on analysis of one or more of at least a portion of the natural language input and a legal statute associated with the natural language input. Further, the method 400 may include transmitting, using the communication device, the one or more suggested electronic forms to the builder device. Yet further, the method 400 may include receiving, using the communication device, one or both of a selection and a modification corresponding to the one or more suggested electronic forms. The generating of the electronic form is based on one or both of the selection and the modification.

In further embodiments, the method 400 may include generating, using the processing device, a block chain based on the electronic form. Further, the method 400 may include storing, using the storage device, the block chain in association with the electronic form. Moreover, the method 400 may include verifying, using the processing device, integrity of the electronic form based on the block chain.

Figure 5:
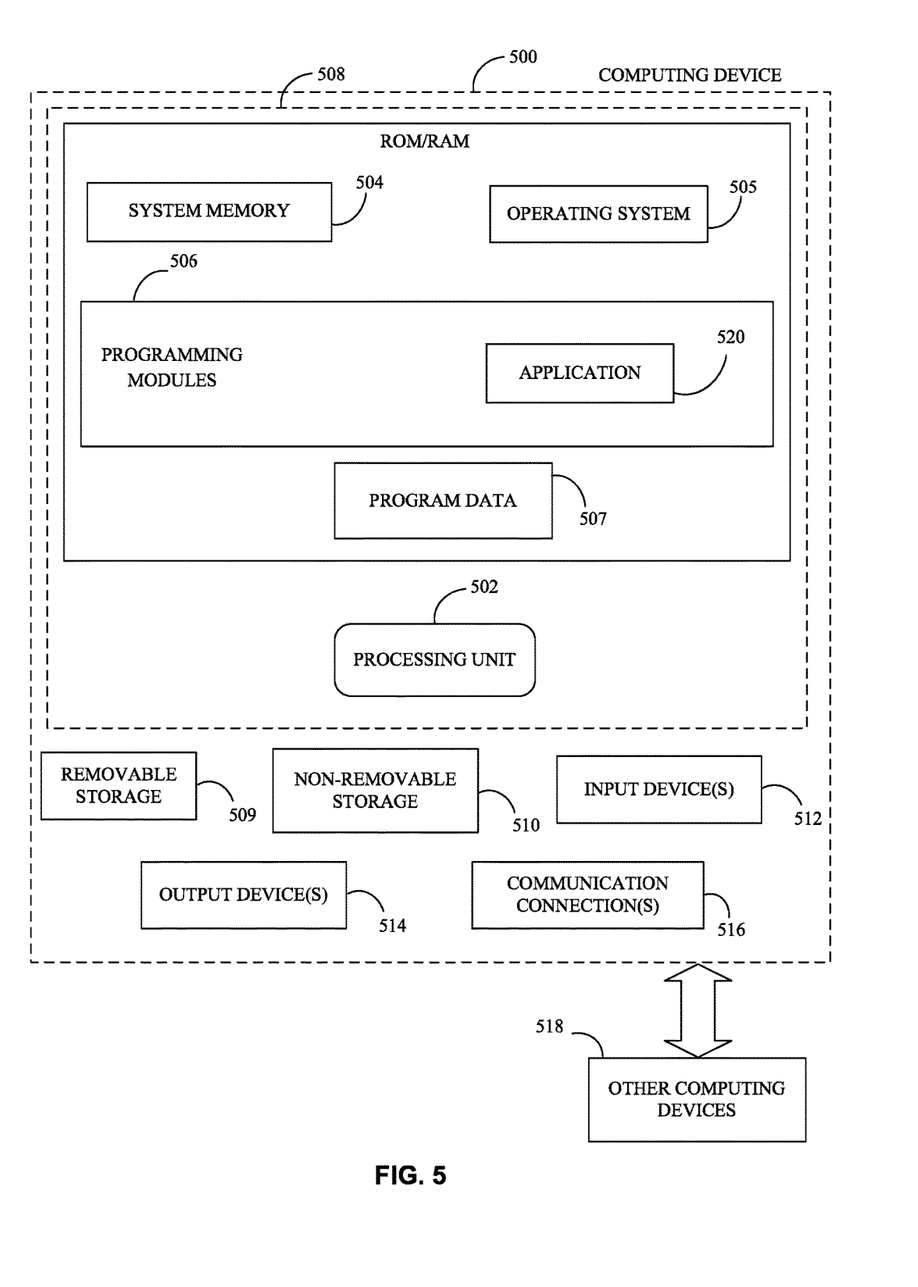
FIG. 5 illustrates an exemplary computing system that may be employed to implement processing functionality for various embodiments.

FIG. 5 is a block diagram of a system including computing device 500. Consistent with an embodiment of the disclosure, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the disclosure.

With reference to FIG. 5, a system consistent with an embodiment of the disclosure may include a computing device or cloud service, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer-readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g., application 520) may perform processes including, for example, one or more stages of method 400 as described above. The aforementioned process is an example, and processing unit 502 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

DETAIL DESCRIPTIONS OF THE EMBODIMENTS

A method of provisioning electronic forms based on natural language is disclosed. The method may include receiving, using a communication device, a natural language input from a builder device. Further, the natural language input represents one or more of a requested data and a presented data associated with a legal process. Further, the method may include analyzing, using a processing device, the natural language input. Further, the method may include generating, using the processing device, an electronic form based on the analyzing of the natural language input. Further, the electronic form may include an input field configured to receive the requested data and an output field configured to present the presented data. Further, the method may include storing, using a storage device, the electronic form. Further, the method may include transmitting, using the communication device, the electronic form to at least one user device.

In some embodiments, the electronic form may include a graphical user interface including the input field and the output field. Further, visual characteristics of each of the input field and the output field may be based on a standard template.

In some embodiments, the method may further include: generating, using the processing device, a block chain based on the electronic form; storing, using the storage device, the block chain in association with the electronic form; and verifying, using the processing device, integrity of the electronic form based on the block chain.

In some embodiments, the method may further include receiving, using the communication device, the electronic form including the requested data from the user device. Further, the requested data may include environmental data captured from at least one sensor comprised in the user device.

In some embodiments, the environmental data represents a noise level. Further, the legal process may be a noise complaint.

In some embodiments, the requested data may include a plurality of requested data. Further, the method further comprises: identifying, using the processing device, at least one user characteristic associated with a user of the user device; and populating, using the processing device, at least one requested data based on the at least one user characteristic.

In some embodiments, the method may further include: transmitting, using the communication device, the natural language input to a plurality of user devices; receiving, using the communication device, a plurality of feedback on the natural language input; and generating, using the processing device, a consolidated feedback associated with the natural language input based on the plurality of feedback.

In some embodiments, the analyzing of the natural language input may include detecting, using the processing device, one or more of an ambiguity, a redundancy, an inconsistency, an inaccuracy and a contradiction. Further, the method further may include transmitting, using the communication device, a warning to the builder device based on the detecting.

In some embodiments, the method may further include: receiving, using the communication device, a legal statute associated with the legal process; analyzing, using the processing device, the legal statute; identifying, using the processing device, one or more of the requested data and the presented data based on the analyzing of the legal statute; transmitting, using the communication device, one or more of at least one suggested input field and at least one suggested output field to the builder device. Further, the at least one suggested input field may be based on the requested data. Further, the at least one suggested output field may be based on the presented data; and receiving, using the communication device, at least one selection from the builder device. Further, the at least one selection identifies each of the input field from the at least one suggested input field and the output field from the at least one suggested output field.

In some embodiments, the method may further include: identifying, using the processing device, at least one suggested electronic form based on analysis of one or more of at least a portion of the natural language input and a legal statute associated with the natural language input; transmitting, using the communication device, the at least one suggested electronic form to the builder device; and receiving, using the communication device, one or more of a selection and a modification corresponding to the at least one suggested electronic form. Further, the generating of the electronic form may be based on one or more of the selection and the modification.

Further, a system for provisioning electronic forms based on natural language is disclosed. The system may include a communication device configured for receiving a natural language input from a builder device. Further, the natural language input represents one or more of a requested data and a presented data associated with a legal process. Further, the communication device may be configured for transmitting an electronic form to at least one user device. Further, the system may include a processing device configured for analyzing the natural language input. Further, the processing device may be configured for generating the electronic form based on the analyzing of the natural language input. Further, the electronic form may include an input field configured to receive the requested data and an output field configured to present the presented data. Further, the system may include a storage device configured for storing the electronic form. Further, the system may include In some embodiments, the electronic form may include a graphical user interface including the input field and the output field. Further, visual characteristics of each of the input field and the output field may be based on a standard template.

In some embodiments, the processing device may be further configured for generating a block chain based on the electronic form and verifying integrity of the electronic form based on the block chain. Further, the storage device may be further configured for storing the block chain in association with the electronic form.

In some embodiments, the communication device may be further configured for receiving the electronic form including the requested data from the user device. Further, the requested data may include environmental data captured from at least one sensor comprised in the user device.

In some embodiments, the environmental data represents a noise level. Further, the legal process may be a noise complaint.

In some embodiments, the requested data may include a plurality of requested data. Further, the processing device may be further configured for: identifying at least one user characteristic associated with a user of the user device; and populating at least one requested data based on the at least one user characteristic.

In some embodiments, the communication device may be further configured for: transmitting the natural language input to a plurality of user devices; and receiving a plurality of feedback on the natural language input. Further, the processing device may be further configured for generating a consolidated feedback associated with the natural language input based on the plurality of feedback.

In some embodiments, the analyzing of the natural language input may include detecting, using the processing device, one or more of an ambiguity, a redundancy, an inconsistency, an inaccuracy and a contradiction. Further, the system further may include transmitting, using the communication device, a warning to the builder device based on the detecting.

In some embodiments, the communication device may be further configured for: receiving a legal statute associated with the legal process; transmitting one or more of at least one suggested input field and at least one suggested output field to the builder device. Further, the at least one suggested input field may be based on the requested data. Further, the at least one suggested output field may be based on the presented data; and receiving at least one selection from the builder device. Further, the at least one selection identifies each of the input field from the at least one suggested input field and the output field from the at least one suggested output field. Further, the processing device may be further configured for: analyzing the legal statute; and identifying one or more of the requested data and the presented data based on the analyzing of the legal statute.

In some embodiments, the processing device may be further configured for: identifying at least one suggested electronic form based on analysis of one or more of at least a portion of the natural language input and a legal statute associated with the natural language input; and transmitting the at least one suggested electronic form to the builder device. Further, the communication device may be further configured for receiving one or more of a selection and a modification corresponding to the at least one suggested electronic form. Further, the generating of the electronic form may be based on one or more of the selection and the modification.

Although the invention has been explained in relation to its preferred embodiment, it is to be understood that many other possible modifications and variations can be made without departing from the spirit and scope of the invention.

I claim:

1. A method of provisioning electronic forms based on natural language, the method comprising:
   receiving, using a communication device, a natural language input from a builder device, wherein the natural language input represents at least one of a requested data and a presented data associated with a legal process;
   analyzing, using a processing device, the natural language input;
   generating, using the processing device, an electronic form based on the analyzing of the natural language input, wherein the electronic form comprises an input field configured to receive the requested data and an output field configured to present the presented data;
   receiving, using the communication device, the electronic form comprising the requested data from the user device, wherein the requested data comprises environmental data captured from at least one sensor comprised in the user device storing, using a storage device, the electronic form; and
   transmitting, using the communication device, the electronic form to at least one user device.

2. The method of claim 1, wherein the electronic form comprises a graphical user interface comprising the input field and the output field, wherein visual characteristics of each of the input field and the output field is based on a standard template.

3. The method of claim 1 further comprising:
   generating, using the processing device, a block chain based on the electronic form;
   storing, using the storage device, the block chain in association with the electronic form; and
   verifying, using the processing device, integrity of the electronic form based on the block chain.

4. The method of claim 1, wherein the environmental data represents a noise level, wherein the legal process is a noise complaint.

5. The method of claim 1, wherein the requested data comprises a plurality of requested data, wherein the method further comprises:
   identifying, using the processing device, at least one user characteristic associated with a user of the user device; and
   populating, using the processing device, at least one requested data based on the at least one user characteristic.

6. The method of claim 1 further comprising:
   transmitting, using the communication device, the natural language input to a plurality of user devices;
   receiving, using the communication device, a plurality of feedback on the natural language input; and
   generating, using the processing device, a consolidated feedback associated with the natural language input based on the plurality of feedback.

7. The method of claim 1, wherein the analyzing of the natural language input comprises detecting, using the processing device, at least one of an ambiguity, a redundancy, an inconsistency, an inaccuracy and a contradiction, wherein the method further comprises transmitting, using the communication device, a warning to the builder device based on the detecting.

8. The method of claim 1 further comprising:
   receiving, using the communication device, a legal statute associated with the legal process;
   analyzing, using the processing device, the legal statute;
   identifying, using the processing device, at least one of the requested data and the presented data based on the analyzing of the legal statute;
   transmitting, using the communication device, at least one of at least one suggested input field and at least one suggested output field to the builder device, wherein the at least one suggested input field is based on the requested data, wherein the at least one suggested output field is based on the presented data; and
   receiving, using the communication device, at least one selection from the builder device, wherein the at least one selection identifies each of the input field from the at least one suggested input field and the output field from the at least one suggested output field.

9. The method of claim 1 further comprising:
   identifying, using the processing device, at least one suggested electronic form based on analysis of at least one of at least a portion of the natural language input and a legal statute associated with the natural language input;
   transmitting, using the communication device, the at least one suggested electronic form to the builder device; and
   receiving, using the communication device, at least one of a selection and a modification corresponding to the at least one suggested electronic form, wherein the generating of the electronic form is based on at least one of the selection and the modification.

10. A system of provisioning electronic forms based on natural language, the system comprising:
- a communication device configured for:
  - receiving a natural language input from a builder device, wherein the natural language input represents at least one of a requested data and a presented data associated with a legal process;
  - transmitting an electronic form to at least one user device;
  - wherein the communication device is further configured for receiving the electronic form comprising the requested data from the user device, wherein the requested data comprises environmental data captured from at least one sensor comprised in the user device;
- a processing device configured for:
  - analyzing the natural language input;
  - generating the electronic form based on the analyzing of the natural language input, wherein the electronic form comprises an input field configured to receive the requested data and an output field configured to present the presented data; and
- a storage device configured for storing the electronic form.

11. The system of claim 10, wherein the electronic form comprises a graphical user interface comprising the input field and the output field, wherein visual characteristics of each of the input field and the output field is based on a standard template.

12. The system of claim 10, wherein the processing device is further configured for generating a block chain based on the electronic form and verifying integrity of the electronic form based on the block chain, wherein the storage device is further configured for storing the block chain in association with the electronic form.

13. The system of claim 10, wherein the environmental data represents a noise level, wherein the legal process is a noise complaint.

14. The system of claim 10, wherein the requested data comprises a plurality of requested data, wherein the processing device is further configured for:
- identifying at least one user characteristic associated with a user of the user device; and
- populating at least one requested data based on the at least one user characteristic.

15. The system of claim 10, wherein the communication device is further configured for:
- transmitting the natural language input to a plurality of user devices; and
- receiving a plurality of feedback on the natural language input, wherein the processing device is further configured for generating a consolidated feedback associated with the natural language input based on the plurality of feedback.

16. The system of claim 10, wherein the analyzing of the natural language input comprises detecting, using the processing device, at least one of an ambiguity, a redundancy, an inconsistency, an inaccuracy and a contradiction, wherein the system further comprises transmitting, using the communication device, a warning to the builder device based on the detecting.

17. The system of claim 10, wherein the communication device is further configured for:
- receiving a legal statute associated with the legal process;
- transmitting at least one of at least one suggested input field and at least one suggested output field to the builder device, wherein the at least one suggested input field is based on the requested data, wherein the at least one suggested output field is based on the presented data; and
- receiving at least one selection from the builder device, wherein the at least one selection identifies each of the input field from the at least one suggested input field and the output field from the at least one suggested output field, wherein the processing device is further configured for:
- analyzing the legal statute; and
- identifying at least one of the requested data and the presented data based on the analyzing of the legal statute.

18. The system of claim 10, wherein the processing device is further configured for:
- identifying at least one suggested electronic form based on analysis of at least one of at least a portion of the natural language input and a legal statute associated with the natural language input; and
- transmitting the at least one suggested electronic form to the builder device, wherein the communication device is further configured for receiving at least one of a selection and a modification corresponding to the at least one suggested electronic form, wherein the generating of the electronic form is based on at least one of the selection and the modification.

* * * * *